(12) United States Patent
Skala

(10) Patent No.: US 7,846,601 B2
(45) Date of Patent: Dec. 7, 2010

(54) FUEL CELL DESIGN AND CONTROL METHOD TO FACILITATE SELF HEATING THROUGH CATALYTIC COMBUSTION OF ANODE EXHAUST

(75) Inventor: Glenn William Skala, Churchville, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1424 days.

(21) Appl. No.: 10/961,698

(22) Filed: Oct. 8, 2004

(65) Prior Publication Data

US 2006/0078766 A1    Apr. 13, 2006

(51) Int. Cl.
*H01M 8/04*    (2006.01)
(52) U.S. Cl. ............... 429/433; 429/455; 429/456; 429/457; 429/483; 429/513; 429/514
(58) Field of Classification Search .............. None
See application file for complete search history.

(56) References Cited

U.S. PATENT DOCUMENTS 3,382,104 A * 5/1968 Worsham et al. ............ 429/13
5,422,195 A * 6/1995 Bernard ..................... 429/17
5,897,972 A * 4/1999 Hosaka ..................... 429/46
6,124,053 A * 9/2000 Bernard et al. ............. 429/34
2002/0145510 A1 10/2002 Kitamura et al.
2003/0008183 A1 * 1/2003 Hsu ......................... 429/13

FOREIGN PATENT DOCUMENTS

EP    0 430 017 B1    3/1995
EP    0 685 897 B1    8/1998

* cited by examiner

*Primary Examiner*—Jennifer K Michener
*Assistant Examiner*—Tony Chuo
(74) *Attorney, Agent, or Firm*—John A. Miller; Miller IP Group, PLC

(57) ABSTRACT

A fuel cell system that provides a flow of anode exhaust gas into the cathode side of the fuel cells without allowing the anode exhaust gas flow and the cathode input flow to mix in a large volume. In one embodiment, strategically positioned perforations in the MEAs allow the anode exhaust gas to cross over to the cathode channels near the cathode input. These perforations could be provided as an array of small holes in an MEA sub-gasket or an MEA carrier frame. In an alternate embodiment, openings are provided through the bipolar plates that allow the anode exhaust to flow into the cathode channels. This configuration would require a special anode half-plate at one end of the stack to provide the opening.

10 Claims, 2 Drawing Sheets

FUEL CELL DESIGN AND CONTROL METHOD TO FACILITATE SELF HEATING THROUGH CATALYTIC COMBUSTION OF ANODE EXHAUST

BACKGROUND OF THE INVENTION

1. Field of the Invention

This invention relates generally to a fuel cell and, more particularly, to a fuel cell that includes specially positioned openings for allowing a controlled amount of an anode exhaust gas flow to be mixed with a cathode input gas flow to provide combustion in the cathode flow channels for heating the fuel cell during start-up.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. A PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. For example, a typical fuel cell stack for an automobile may have two hundred stacked fuel cells. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. For the automotive fuel cell stack mentioned above, the stack would include about four hundred bipolar plates. The bipolar plates include an anode side and a cathode side for adjacent fuel cells in the stack. Anode gas flow channels are provided on the anode side of the bipolar plates that allow the anode gas to flow to the MEA. Cathode gas flow channels are provided on the cathode side of the bipolar plates that allow the cathode gas to flow to the MEA. The bipolar plates are made of a conductive material, such as stainless steel, so that they conduct the electricity generated by the fuel cells out of the stack. The bipolar plates also include flow channels through which a cooling fluid flows.

It is desirable during certain fuel cell operating conditions, such as fuel cell start-up, low power operation, low ambient temperature operation, etc., to provide supplemental heat to the fuel cells to maintain the desired temperature within the fuel cell stack for proper water management and reaction kinetics purposes. Particularly, the MEAs must have a proper humidification and the cells must have a minimum temperature to operate efficiently.

The anode stoichiometry is typically greater than one, for example 1.02, during fuel cell operation so that hydrogen is properly distributed to the MEAs. Therefore, excess or unused hydrogen is generally available at an anode exhaust that must be properly dispersed or contained because it is combustible. It has been proposed in the art to combine this anode exhaust gas with the cathode input air to provide combustion either in the anode channels or the cathode channels to provide the desired supplemental heat for cold starts, low temperature or low power operating conditions, cabin heating, partially humidifying the cathode input gas, etc.

SUMMARY OF THE INVENTION

In accordance with the teachings of the present invention, a fuel cell system is disclosed that provides a flow of anode exhaust gas into the cathode side of the fuel cells without allowing the anode exhaust gas flow and the cathode input gas flow to mix in a large volume. In one embodiment, strategically positioned perforations in the MEAs allow the anode exhaust gas to cross over to the cathode channels near the cathode input. These perforations could be provided as an array of small holes in an MEA sub-gasket or an MEA carrier frame. In an alternate embodiment, openings are provided through the bipolar plates that allow the anode exhaust gas to flow into the cathode channels. This configuration would require a special anode half-plate at one end of the stack to provide the opening.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell that includes openings for allowing an anode exhaust gas to be mixed with a cathode input gas in a cathode channel is merely exemplary in nature, and is in no way intended to limit the invention or its applications or uses.

The present invention is a fuel cell design that provides a flow of anode exhaust gas into the cathode side of the fuel cell to provide catalytic combustion without allowing the anode exhaust gas and the cathode gas to mix in a large volume. The present invention uses small channels, humidified conditions and heat removal capabilities of the fuel cell stack to provide a safer environment for the controlled catalytic combustion of hydrogen on the cathode side of the MEA. By feeding the anode exhaust gas directly from an end of the anode channels through an array of small holes that go to some, or all, of the channels on the cathode side of the cell, the air/hydrogen mixture will not be allowed to collect in a large volume and will react on the platinum surface of the cathode side of the MEA. Consequently, the stack would not need to have an anode exhaust header for manifolds since all of the un-consumed anode exhaust gases will exit the stack with the cathode exhaust.

The fuel cell design of the invention is passive, and thus will require a unique operating methodology. Because any excess hydrogen is continuously fed into the cathode of the stack, a control of that flow is necessary for system efficiency. Essentially, the stack operating temperature can be controlled to some degree by the anode stoichiometry, particularly the amount of excess hydrogen. Anode stoichiometry, in turn, is controlled by the pressure differential between the anode exhaust and cathode input so the interaction between anode pressure and the cathode pressure controls how much anode exhaust gas flows into the cathode channels.

Normally, an anode stoichiometry of about 1.02 could be used. This means that a slight excess of hydrogen is provided for a particular output power because the distribution of the hydrogen to the membrane is not 100%. Therefore, there will be un-reacted hydrogen in the anode exhaust. This implies that for a given power level, 2% of the hydrogen's heating energy would be turned into waste heat on the cathode side of the cells. By always feeding anode exhaust into the cathode stream of the stack, the amount of supplemental heat can be largely controlled by controlling the anode stoichiometry alone. This approach can be applied when additional heat is required for warming up the stack at start-up, keeping the stack up to a minimum temperature at low ambient temperatures and low power levels, cabin heating, windshield defrosting, etc.

Figure 1:
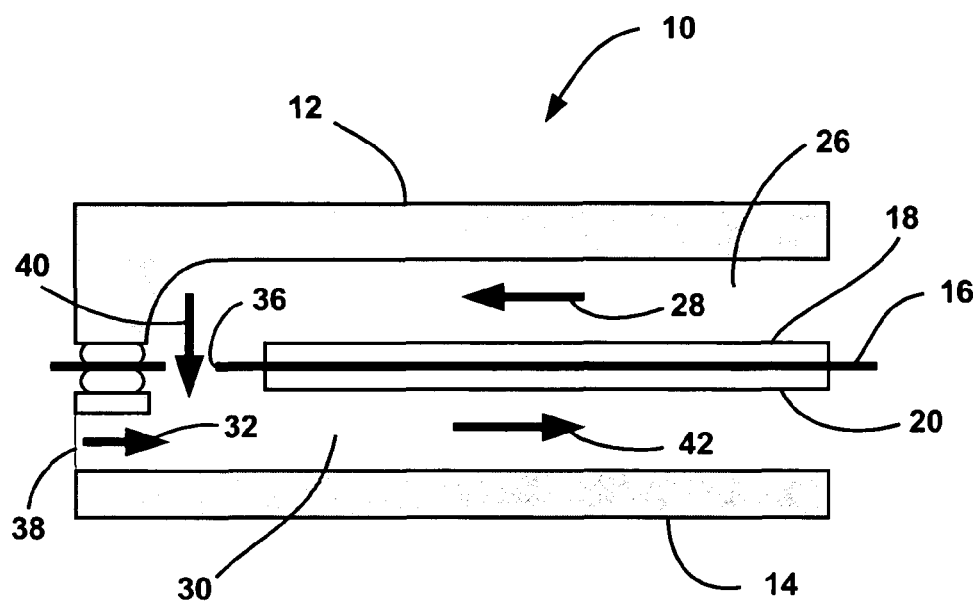
FIG. 1 is a cross-sectional view of a portion of a fuel cell stack including an opening in an MEA that allows a controlled amount of anode exhaust gas to flow into a cathode channel, according to one embodiment of the present invention.

FIG. 1 is a cross-sectional view of a fuel cell 10 in a fuel cell stack that employs the fuel cell design discussed above, according to one embodiment of the present invention. The fuel cell 10 includes half of a bipolar plate 12 on the anode side of an MEA 16 and half of a bipolar plate 14 on the cathode side of the MEA 16. The MEA 16 includes a membrane on which a catalyst is deposited so that a catalyst layer of the MEA 16 faces the anode side bipolar plate 12 and a catalyst layer of the MEA 16 faces the cathode side bipolar plate 14. An anode diffusion media layer 18 is positioned in contact with the anode side of the MEA 16 and a cathode diffusion media layer 20 is positioned in contact with the cathode side of the MEA 16. The diffusion media layers 18 and 20 are porous layers that provide for gas transport to and water transport from the MEA 16. The other side of the bipolar plate 12 would be the cathode side for one adjacent fuel cell and the other side of the bipolar plate 14 would be the anode side for the other adjacent fuel cell. Also, the bipolar plates 12 and 14 would include cooling fluid flow channels.

An anode flow channel 26 is provided between the anode diffusion media layer 18 and the anode side bipolar plate 12 that receives an anode input gas flow 28 (hydrogen) that flows into the diffusion media layer 18 to react with the catalyst on the anode side of the MEA 16, as is well understood in the art. Likewise, a cathode channel 30 is provided between the diffusion media layer 20 and the cathode side bipolar plate 14 that receives a cathode gas flow 32 (air) through an input port 38 of the bipolar plate 14 that flows into the diffusion media layer 20 to react with the catalyst on the cathode side of the MEA 16. The bipolar plates 12 and 14 would be designed to provide a series of parallel spaced apart anode flow channels 26 and cathode flow channels 30. Suitable manifolds (not shown) would be provided to direct the anode input gas to the input of the anode flow channels 26 and direct the cathode input gas to the input of the cathode flow channels 30, as would be well understood to those skilled in the art.

According to the invention, a specially designed opening 36 is provided in the MEA 16 opposite to the inlet end of the channel 26 proximate the inlet port 38 of the channel 30. Therefore, any excess or un-reacted hydrogen in a humidified anode exhaust gas flow 40 that is not absorbed into the diffusion media layer 18 and would otherwise be exhausted from the stack is forced through the opening 36 and into the cathode channel 30. The bipolar plate 12 is designed so that a portion of the plate 12 directs the anode exhaust gas flow 40 through the opening 36. The humidified anode exhaust gas flow 40 combines with the cathode input gas flow 32 to provide a humidified gas flow mixture 42 in the cathode channel 30. The additional humidification provided by the humidified anode exhaust gas flow 40 is sufficient to reduce or eliminate the need for external humidification of the cathode flow 38. The gas flow mixture 42 combusts in the cathode channel 30 because of the hydrogen/air mixture and the cathode catalyst. This combustion heats the fuel cell 10 for low temperature operating conditions and the like, as discussed above. Therefore, the temperature of the fuel cell stack does not go below a certain temperature depending on the control parameters during stack operation. The un-combusted flow mixture 42 is sent to an exhaust manifold (not shown) to be output through a single exhaust port in the stack.

Because the diameter of the channel 30 is relatively small, for example 1 mm, the amount of heat energy in the hydrogen/air mixture in the cathode channel 30 is not enough to damage the diffusion media layer 20 and/or the MEA 16 as long as the heat generated can be carried away by the coolant. Further, the small diameter of the channel 30 provides a restricted area that maintains the combustion at a relatively low temperature by providing quick heat removal. The size of the channel 30 combined with the humidified gases and diluted mixture, as well as the heat removal capability of the cell design, would minimize the risk of uncontrolled combustion. Also, it is not necessary to provide an anode exhaust gas manifold to collect the anode exhaust gas because it is all sent to the cathode channels 30, and any un-combusted hydrogen is output through the cathode exhaust gas output.

The opening 36 through the MEA 16 is a generalized depiction of the several locations and designs for a suitable opening within the spirit and scope of the present invention. It may be desirable to position the opening 36 at a location on the MEA 16 that does not include the catalyst so that combustion does not occur around the edges of the opening 36. In one embodiment, the exhaust gas flow 40 will pass through an array of small holes for all of the parallel channels in an MEA sub-gasket or an MEA carrier frame. Also, the opening 36 could be a slot that extends across all of the channels for the MEA 16. Further, the diameter of the opening 36 is designed to provide the desired pressure drop across the anode input opening.

Figure 2:
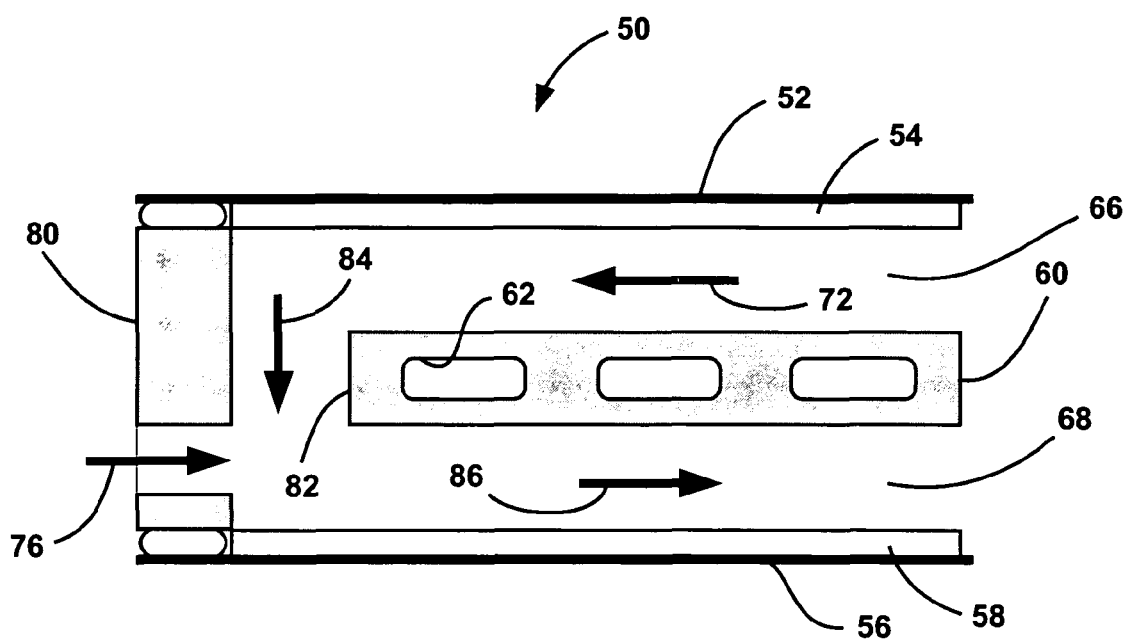
FIG. 2 is a cross-sectional view of a portion of a fuel cell stack including an opening through a bipolar plate that allows an anode exhaust gas to flow into a cathode channel, according to another embodiment of the present invention.

FIG. 2 is a cross-sectional view of a fuel cell 50 in a fuel cell stack, according to another embodiment of the present invention. The fuel cell 50 includes a first MEA 52 and an anode diffusion media layer 54 provided adjacent thereto. Further, the fuel cell 50 includes a second MEA 56 and a cathode diffusion media layer 58 provided adjacent thereto so that the diffusion media layers 54 and 58 oppose each other. A bipolar plate 60 including cooling channels 62 is positioned between the MEAs 52 and 56, as shown. An anode channel 66 is provided between the anode diffusion media layer 54 and the bipolar plate 60 and a cathode channel 68 is provided between the cathode diffusion media layer 58 and the bipolar plate 60, as shown. A humidified anode gas flow 72 flows through the channel 66 and is diffused by the diffusion media layer 54 to react with the catalyst on the cathode side of the MEA 52. Likewise, a cathode input gas flow 76 flows through an opening 78 of a manifold portion 80 into the cathode channel 68 where it is diffused by the diffusion media layer 58 to react with the catalyst on the MEA 56.

According to this embodiment of the invention, an opening 82 is provided between an end of the bipolar plate 60 and the manifold portion 80 so that an anode exhaust gas flow 84 that is not diffused into the diffusion media layer 54 flows through the opening 82 and combines with the cathode input gas 76 to provide an anode exhaust gas and cathode input gas mixture flow 86 in the channel 68. Because the flow of excess hydrogen would be very small relative to total exhaust from the hundreds of other fuel cells in the stack, it would easily be diluted to a safe level.

Figure 3:
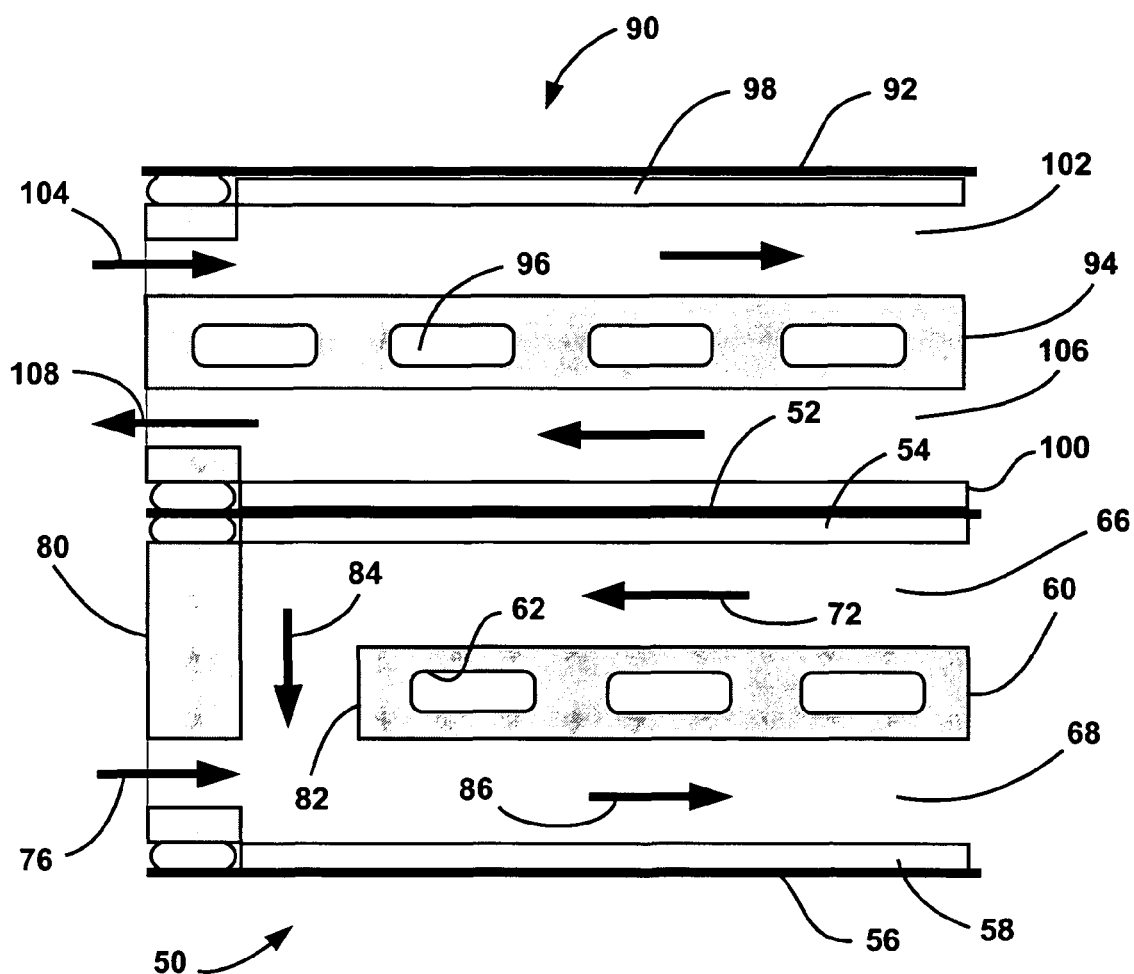
FIG. 3 is a cross-sectional view of a portion of a fuel cell stack including an opening through a bipolar plate that allows an anode exhaust gas to flow into a cathode channel, where the anode and cathode input gases flow in the same direction, where according to another embodiment of the present invention.

FIG. 3 is a cross-sectional view of a fuel cell 90 positioned adjacent to the fuel cell 50 in a fuel cell stack, according to another embodiment of the present invention, where like reference numerals identify like elements in the embodiments discussed above. In this embodiment, the anode and cathode input gases flow in the same direction. The fuel cell 90 includes an MEA 92, a bipolar plate 94 including flow channels 96, and diffusion media layers 98 and 100. An anode flow channel 102 receives an anode gas flow 104 and a cathode flow channel 106 receives a cathode gas flow and outputs a combined anode and cathode exhaust 108. This embodiment would require a more complicated plate design because there would be manifolds (not shown) for both the anode and cathode inlet ports at both ends of each bipolar plate 60 and 94 and manifolds (not shown) for both the anode and cathode exhaust ports at both ends of each bipolar plate 60 and 94.

A simplified description of the control by the bipolar plate design discussed above can be reduced to the cathode inlet pressure and the anode exhaust pressure. These two pressures determine how much anode exhaust gas flows into the channels to the cathode side of each fuel cell. The factors that determine those two pressures are anode and cathode flow rate, anode and cathode channel geometry, the back pressure of the exhaust path and the consumption rate of the reactants. The control methodologies would be slightly different for each of the mechanizations, but all would fundamentally require controlling the difference between the anode exhaust pressure and the cathode inlet pressure.

One example of a control methodology for a low temperature start, according to the invention, includes first initiating the cathode and anode input flows at a rate sufficient to support the electric load applied to the fuel cell stack, and simultaneously, or after a slight delay, provide excess cathode and anode gas flow inputs, up to about 10% hydrogen by volume, to support a very lean combustion of the excess hydrogen on the cathode side of the fuel cell at a heat release rate that is sufficient to warm the fuel cell stack in a reasonable time without overheating the cells. As the temperature of the fuel cells rises, the excess cathode and anode gas flow can be reduced to prevent overheating. Control of the coolant flow can also be used to control the warm-up of the cells and/or provide a faster warm-up of the fuel cell system and/or for cabin heating.

As discussed above, when operating the fuel cell at very low loads, heat losses may require that the fuel cell stack be heated to maintain a desired operating temperature. Keeping the fuel cell stack within the preferred operating temperature using the heating techniques discussed above would require an increase in anode and cathode flow rates by amounts sufficient to provide a very lean, up to about 10% hydrogen by volume, combustion, and at a heat release rate that is sufficient to warm the fuel cell in a reasonable amount of time without overheating the cells. As the temperature of the fuel cells rises, the excess cathode and anode flows can be reduced to prevent overheating of the cells. Additionally, coolant flow can be used to control the rate of warm-up and/or provide a technique for additional cabin heating.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising:
 a first bipolar plate;
 a second bipolar plate; and
 a membrane electrode assembly (MEA) positioned between the first and second bipolar plates so as to define an anode channel between the first bipolar plate and the membrane electrode assembly (MEA) and a cathode channel between the second bipolar plate and the membrane electrode assembly (MEA), said anode channel receiving an anode input gas flow and said cathode channel receiving a cathode input gas flow, said membrane electrode assembly (MEA) including a plurality of openings that direct an anode exhaust gas flow from the anode channel to the cathode channel to provide an anode exhaust gas and cathode input gas mixture that combusts in the cathode channel, wherein the plurality of openings form at least one slot extending across a plurality of parallel anode channels and cathode channels.

2. The fuel cell according to claim 1 wherein the slot is at a location on the membrane electrode assembly (MEA) that does not include a catalyst.

3. The fuel cell according to claim 1 wherein the anode input gas flow through the anode channel is in an opposite direction to the cathode input gas flow through the cathode channel.

4. The fuel cell according to claim 1 wherein the anode input gas flow through the anode channel is in the same direction as the cathode input gas flow through the cathode channel.

5. The fuel cell according to claim 1 wherein the cathode channel has a diameter of about 1 mm.

6. The fuel cell according to claim 1 wherein the fuel cell operates with an anode stoichiometry of about 1.02.

7. The fuel cell according to claim 1 wherein the fuel cell is part of a fuel cell stack.

8. The fuel cell according to claim 7 wherein the fuel cell stack is on a vehicle.

9. A fuel cell stack comprising:

a plurality of bipolar plates;

a plurality of membrane electrode assemblies (MEAs), said plurality of bipolar plates and membrane electrode assemblies (MEAs) being arranged in an alternating configuration within the fuel cell stack, said plurality of bipolar plates and membrane electrode assemblies (MEAs) defining a plurality of anode channels and cathode channels therebetween, said anode channels receiving an anode input gas flow and said cathode channels receiving a cathode input gas flow; and a plurality of openings extending through the membrane electrode assemblies so as to allow an anode exhaust gas flow from ends of anode flow channels into adjacent cathode flow channels to provide an anode exhaust gas and cathode input gas mixture that combusts in the cathode channel, wherein the plurality of openings define a slot extending across a plurality of parallel anode channels and cathode channels.

10. The fuel cell stack according to claim 9 wherein the cathode channels have a diameter of about 1 mm.

\* \* \* \* \*